(No Model.)

W. SPITZNASS.
HOBBY HORSE.

No. 314,351. Patented Mar. 24, 1885.

WITNESSES:

INVENTOR:
W. Spitznass
BY Munn & Co
ATTORNEYS.

UNITED STATES PATENT OFFICE.

WILLIAM SPITZNASS, OF NEW ATHENS, ILLINOIS.

HOBBY-HORSE.

SPECIFICATION forming part of Letters Patent No. 314,351, dated March 24, 1885.

Application filed August 23, 1884. (No model.)

*To all whom it may concern:*

Be it known that I, WILLIAM SPITZNASS, of New Athens, in the county of St. Clair and State of Illinois, have invented a new and Improved Hobby-Horse, of which the following is a full, clear, and exact description.

The object of my invention is to provide a new and improved hobby-horse which is so constructed that it can be propelled by working or rocking the horse up and down, and can easily be steered.

The invention consists in the peculiar construction and arrangement of parts, as hereinafter fully described, and pointed out in the claims.

Reference is to be had to the accompanying drawings, forming part of this specification, in which similar letters of reference indicate corresponding parts in all the figures.

Figure 1:
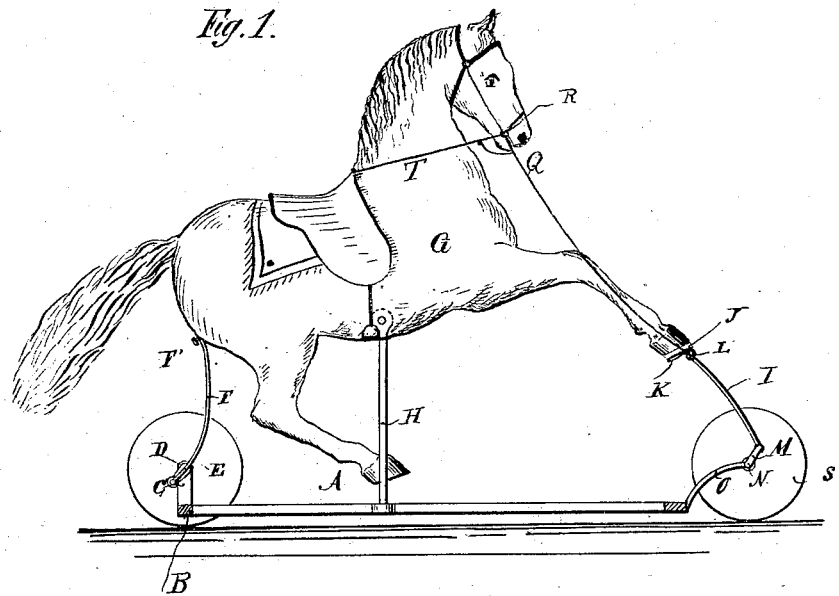
Figure 2:
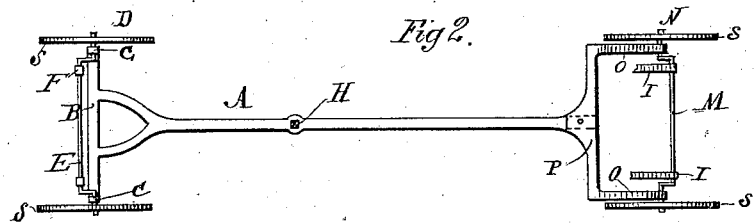
Figure 3:
Figure 4:
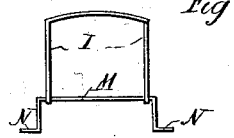

Figure 1 is a side view of my improved hobby-horse, parts being in section. Fig. 2 is a plan view, the horse-body being removed. Fig. 3 is a plan view of the front plate. Fig. 4 is a front view of the front axle and connecting-frame.

A bar or reach, A, is provided at its rear end with a rigid cross-piece, B, either made integral with the reach A or secured to the same, the ends of which piece B are bent upward to form standards C, in which the rear axle, D, is journaled, the said axle being bent to form a crank part, E, connected by a connecting rod or frame, F, with the rear end of a horse-body, G, pivoted about at its center of gravity on a standard, H, projecting upward from the bar or reach A.

Instead of pivoting the upper end of the bar or frame F to the horse-body, a pin, F', can be passed through a slot in the upper end of the bar or frame F into the rear part of the body.

To the hoofs of the front legs of the horse-body a plate, J, is secured, to the under side of which a forked plate, K, is pivoted, the prongs projecting toward the front, and having their ends bent to form eyes L, for receiving the cross-piece of a connecting-frame, I, having its opposite end pivoted on the crank part M of the front axle, N, journaled in standards O, projecting upward from the ends of a frame, P, pivoted to the front end of the reach A in such a manner that it can swing laterally.

Cords Q, secured to the ends of the plate K, are passed through rings R in the bridle, and then form the reins T.

The standards O are inclined for the purpose of lengthening the frame.

The wheels S are all driving-wheels, and are rigidly mounted on the ends of the axles D and N.

By rocking the horse the crank-axles and the wheels on the same are revolved and the vehicle is propelled.

By pulling on the cords Q the plate K is swung toward the right or left, and the frame P is turned with it, thus guiding the vehicle to the right or left. As the crank-frame I connects the front axle, N, with the pivoted plate K, the steering of the vehicle does not interfere with the propelling of the same.

Having thus described my invention, what I claim as new, and desire to secure by Letters Patent, is—

1. The combination, with a rocking horse-body, of a plate pivoted to the under side of the hoofs of the front legs, and of a connecting rod or frame connecting the said plate with a crank-shaft provided with driving-wheels and journaled in a plate pivoted on the front end of the reach of the vehicle-frame, substantially as herein shown and described.

2. The combination, with the bar or reach A, having a cross-piece, B, with upwardly-projecting ends, of the crank shaft or axle D, the standard H, the horse-body G, pivoted on the same, the connecting rod or frame F, connecting the shaft D with the rear part of the horse-body, the pivoted plate K, the connecting rod or frame I, the crank-shaft M, and the pivoted frame P, in which the front shaft or axle is journaled, substantially as herein shown and described.

3. The combination, with the rocking horse-body G and a frame for supporting it, of the plate K, pivoted to the hoofs, the connecting rod or frame I, the crank-shaft N, the frame or plate P, and the cords Q T, extending from the plate K up through rings on the bridle to the saddle, substantially as herein shown and described.

4. The combination, with the rocking horse-body G and a frame for supporting it, of the plate J, secured to the hoofs of the front legs, the forked plate K, pivoted to the plate J, the connecting rod or frame I, the crank-shaft N, and the plate P, pivoted to the reach A of the vehicle-frame, substantially as herein shown and described.

WILLIAM SPITZNASS.

Witnesses:
MICH. SCHLESINGER,
THOMAS SOUTH.